(12) United States Patent
Dausmann

(10) Patent No.: US 8,599,458 B2
(45) Date of Patent: Dec. 3, 2013

(54) METHOD AND APPARATUS FOR THE PRODUCTION OF VOLUME TRANSMISSION AND/OR REFLECTION HOLOGRAMS

(75) Inventor: Günther Dausmann, Grasbrunn (DE)

(73) Assignee: Hologram Industries Research GmbH, Pliening-Ottersberg (DE)

( * ) Notice: Subject to any disclaimer, the term of this patent is extended or adjusted under 35 U.S.C. 154(b) by 0 days.

(21) Appl. No.: 13/128,878

(22) PCT Filed: Nov. 12, 2009

(86) PCT No.: PCT/DE2009/001589
§ 371 (c)(1),
(2), (4) Date: May 12, 2011

(87) PCT Pub. No.: WO2010/054636
PCT Pub. Date: May 20, 2010

(65) Prior Publication Data
US 2011/0214804 A1 Sep. 8, 2011

(30) Foreign Application Priority Data
Nov. 17, 2008 (DE) .......... 10 2008 057 784

(51) Int. Cl.
*G03H 1/20* (2006.01)
(52) U.S. Cl.
USPC .......... 359/12; 156/272.8
(58) Field of Classification Search
USPC .......... 156/272.8, 152; 359/12, 22, 24, 25
See application file for complete search history.

(56) References Cited

U.S. PATENT DOCUMENTS 3,764,430 A * 10/1973 Schrenk .......... 156/150
3,882,207 A * 5/1975 Hannan et al. .......... 264/1.33
(Continued)

FOREIGN PATENT DOCUMENTS

DE 102007042385 3/2009
EP 0726142 8/1996
(Continued)

OTHER PUBLICATIONS

JP 09212071 English Machine Translation.*
(Continued)

*Primary Examiner* — Richard Crispino
*Assistant Examiner* — Elizabeth Royston
(74) *Attorney, Agent, or Firm* — Mark M. Friedman

(57) ABSTRACT

A method and an apparatus are described for producing a volume transmission hologram and/or a volume reflection hologram from a film (10) having a backing foil (12) and a holographic layer (14). In said method, the film (10) is guided over a drum (18), on which the film (10) is brought in contact with the master hologram (22). The master hologram (22) and the film (10) are simultaneously moved through an exposure zone (20). In the exposure zone (20), the film (10) and the master hologram (22) are irradiated with a linearly expanding exposure laser beam (32) in order to reproduce the master hologram (22) in the photopolymer layer (14). Both volume reflection and volume transmission holograms can be produced in the polymer layer (14) of the film (10) that is guided over the drum by means of only one drum (18). For this purpose, two master holograms (22, 22') are or can be associated with the drum and are moved in synchrony therewith while lying thereon, the film (10) being located radially below the first master hologram (22) and/or radially above the second master hologram (22').

8 Claims, 2 Drawing Sheets

(56) References Cited

Figure 1:
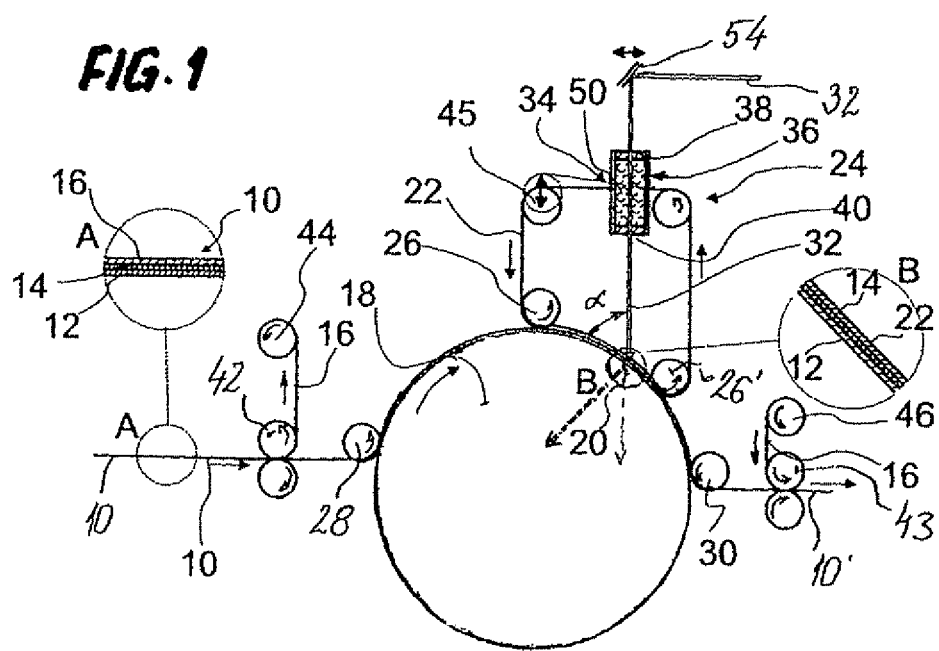

U.S. PATENT DOCUMENTS 6,055,075 A * 4/2000 Nishikawa ..................... 359/12
6,747,768 B1   6/2004 Knocke et al.

FOREIGN PATENT DOCUMENTS

| EP | 1515199 | 3/2005 | | |
|----|---------|--------|---|---|
| JP | 02235085 | 9/1990 | | |
| JP | 03148687 | 6/1991 | | |
| JP | 05249877 | 9/1993 | | |
| JP | 07104650 | 4/1995 | | |
| JP | 09212071 A * | 8/1997 | ............... | G03H 1/20 |
| WO | WO9619754 | 6/1996 | | |

OTHER PUBLICATIONS

JP 09212071 English Abstract.*

* cited by examiner

METHOD AND APPARATUS FOR THE PRODUCTION OF VOLUME TRANSMISSION AND/OR REFLECTION HOLOGRAMS

Both from DE 198 09 502 B4 and DE 198 09 503 A1, a method and a device for producing a contact copy of a reflection hologram are known. The hologram is produced by attaching a master hologram to a flat bed and pressing the holographic film onto the master hologram with subsequent light exposure. To avoid local tensions in the film, a certain waiting time must be observed after the film has been pressed onto the master hologram. To achieve fast mass production of large item numbers, buffer zones are provided in which the film remains over the required waiting time of approximately 4 to 5 seconds before the hologram is exposed in its entirety so as to reproduce the master hologram in a photopolymer layer of the film.

Similar devices and methods are also known for the production of reflection holograms required in large numbers particularly in security elements. For producing a reflection hologram, a transparent master hologram is placed on a reflecting photopolymer film or a photopolymer film with a reflecting backing layer, respectively, so as to produce a contact copy of the master hologram.

EP 0 726 142 B1 describes a system for the continuous lamination and delamination of foils in which a photosensitive film is guided over a drum equipped with master holograms and exposed to laser. The film, which consists of a photosensitive layer and is provided with base foils on both sides, is fed by rolls; the lower base foil is removed and the film is laminated onto the drum by a pad roller so that the photolayer adheres to the drum. After laser exposure for producing the hologram copy, as well as preceding and subsequent UV exposure for mask trimming and facilitating the delamination, the film is drawn off the drum, provided with a protective foil, UV-baked and removed. With this device, by using reflection master holograms applied on the drum, only reflection holograms can be duplicated. The production of transmission holograms, or a simultaneous or optionally separate/individual production of both transmission and reflection holograms by using the same drum as the basic device is neither envisaged nor possible.

From JP 05249877 A and JP 03148687 A, methods and devices for copying/duplicating holograms are also known where reflection master holograms are fixed to a rotating drum while a photosensitive film is continuously superimposed on the master holograms fixed to the drum and is guided together with them and exposed. With these devices as well, only reflection holograms (no transmission holograms) can be copied.

Finally, from WO 96/19754 A1, a method and a device for producing transmission holograms are known which are also suitable for continuous mass production. Thereby, a transparent (glass) drum is provided on which a master transmission hologram is arranged over which, in turn, a photosensitive film is continuously entrained and guided. Exposure takes place from the drum interior (axially introduced and radially deflected), where index match liquid is introduced between film and master and glass cylinder to prevent undesired reflections, both by spraying onto the drum and by immersing the drum into a bath system. With this known device as well, only transmission holograms can be copied, no reflection holograms, much less a combination of these holograms. In addition, especially because of the necessary UV curing, a fused quartz drum with high optical quality must be used which, in the case of large holograms, must be provided in sizes which make it extremely expensive, rendering an economical production of such transmission holograms impossible.

Therefore, the aim of the invention is to provide a method and a device of the type mentioned above for producing a volume transmission and/or a volume reflection hologram, which is less costly than conventional methods and devices and can be used flexibly both for reflection holograms and for transmission holograms.

As already known at least in part, a photosensitive film, made up of a backing foil, a photopolymer layer and a protective foil, is guided over a cylindrical convex drum surface and, on this surface, is contacted with a master hologram. The master hologram is moved simultaneously and, in particular, free of slippage together with the film. The film and the master hologram are moved together into an exposure zone while both are spanned on the drum surface. In the exposure zone, the film and the master hologram are irradiated by a linearly expanding exposure laser for reproduction of the master hologram in the photopolymer layer.

By spanning the film and, over a common partial distance also the master hologram, on the drum surface, an even load pressure between the film and the master hologram can be produced in a particularly simple manner due to the convex curvature of the drum surface, and local tensions can be avoided. By exposure of the hologram during movement by a linearly expanding exposure laser, a continuous process is made possible by means of which even very long film tracks and/or very long master holograms can easily be exposed.

It is essential for the invention that with the (same) drum, both reflection and transmission volume holograms can be created simultaneously or, if desired, separately in the photopolymer layer of the film guided over the drum, wherein for this purpose, two master holograms of the drum are allotted or can be allotted and are moved synchronously with the drum and its overlying film. Thereby, a first master hologram is located radially outside of the film, whereas the second master hologram is applied radially inside the film on the drum.

Also, the film, in a well-known manner, has a protective film which is removed from the photopolymer layer before the photopolymer layer of the film is brought in contact with the master hologram. In this manner, image defects can be avoided which can be caused in conventional methods by the protective film arranged between the master hologram and the photopolymer. After exposure of the photopolymer layer, the master hologram is removed from the film and the previously removed or a new protective film is re-applied to the photopolymer layer. According to the invention, a repositioning of different rolls of the protective film can be avoided if the already removed protective film is guided back to the film by a deviation mechanism and re-laminated onto it after exposure of the photopolymer layer.

Reflections on a contact surface between the photopolymer layer and the master hologram can be avoided if a thin liquid film of an index match liquid is introduced or present in a contact area between the photopolymer layer and the master hologram. This is achieved by applying the photopolymer layer on the outside of the drum, and then it contacts the master hologram directly and is guided in this way through the exposure zone. With polymer layers, however, this is not necessary since they themselves act like index match when the protective foil is removed.

Furthermore, it is proposed that the master hologram for transmission replication (transmission production) form a closed endless loop which is guided in a (film) guide device which is arranged radially outside the drum surface. The master hologram can then practically be endlessly synchronously unrolled on the film with the photopolymer layer. It is thus situated radially outside the film.

A diverting of the exposure laser within the loop formed by the master hologram can be avoided if the exposure laser is guided, in an (upper) exposure zone, through the master hologram into an interior of the loop and radiated from the interior of the loop into the exposure zone. Thus, the exposure laser irradiates the master hologram twice, namely in the upper irradiation zone and in the exposure zone on the drum, before it impinges on the photopolymer film or a reflective layer of the film overlying the drum, respectively.

For the production of volume reflection holograms, the master hologram is fixed to the surface of the drum so that the film contacts the master hologram from radially outside.

According to an embodiment of the invention, it is proposed that the drum surface be the surface of a glass cylinder into which the linearly expanding exposure laser beam is irradiated in a first portion of the drum surface so that in the exposure zone, the exposure laser beam exits the glass cylinder from radially inside. Due to the possibility of exposure from the radial interior, reflection holograms can be produced by means of a transmission master hologram mounted on the drum surface.

Reflections or diffractions in the border areas of the glass cylinder can be avoided if these areas of the glass cylinder are immersed into an index match liquid. As explained above, this is not necessary with polymers since they themselves act like index match.

The device according to the invention that performs the method described hereinabove comprises in particular a drum surface for guiding the film and contacting the film with the master hologram, a first and a second (at least one) contacting roller (guide and/or tensioning roller) for contacting the master hologram with the film, a laser light source and cylinder optics for linearly expanding the laser light source (lengthwise) as well as a driving mechanism for moving the master hologram and the film simultaneously. The driving mechanism moves the film simultaneously and free of slippage through an exposure zone of the device together with the master hologram, in which zone the film and the master hologram are irradiated by the linearly expanding exposure laser beam so as to reproduce the master hologram in the photopolymer layer. Also, it is essential that two master holograms are allotted or can be allotted to the drum and are moved synchronously with it, wherein the one master hologram is provided radially above the film while the second master hologram being fixed onto the drum radially below the film.

In particularly advantageous embodiments of the invention, the device moreover comprises a deviation mechanism for returning and re-laminating an already removed protective film onto the photopolymer layer and/or a (film) guide device for guiding the master hologram, which is located radially outside the film and closed in a (master) loop, in an endless loop. In a particularly advantageous embodiment of the invention, the guide device as a coherent assembly or independent module, respectively, can be detached from the drum surface so that changing the device between different configurations suitable for producing transmission holograms or reflection holograms is easily possible. However, to achieve this purpose the master loop could only be provided removably or detachably from the guide device.

In the exposure zone, the master hologram influences the exposure laser beam only if the angle between the exposure laser beam and the master hologram is confined to a narrowly limited area in which constructive interferences between diffracted portions of the laser beam and the passing of the zero order can form. By suitable adjustment of this angle, which can take place especially by means of an adjustment mechanism of the guide device, such interferences can be securely avoided.

In practice, volume holograms are mostly exposed with and irradiated by slightly diverging reference waves. To compensate for this divergence, an incident angle of the exposure laser beam in the exposure zone can be varied depending on the position of the line to be exposed. For this purpose, an adjustable mirror can be introduced in the optical path of the exposure laser beam, which mirror can be moved for instance by a linear motor, in dependence on the position of the master hologram.

Furthermore, the device according to the invention can comprise a glass cylinder of the type described above, which can be embodied either as a hollow cylinder or as a cylinder made of solid material, and which for avoiding reflections in critical parts of the surface is immersed in a bath of index match liquid. The glass cylinder can further comprise means for mounting a transmission master hologram.

Figure 2:
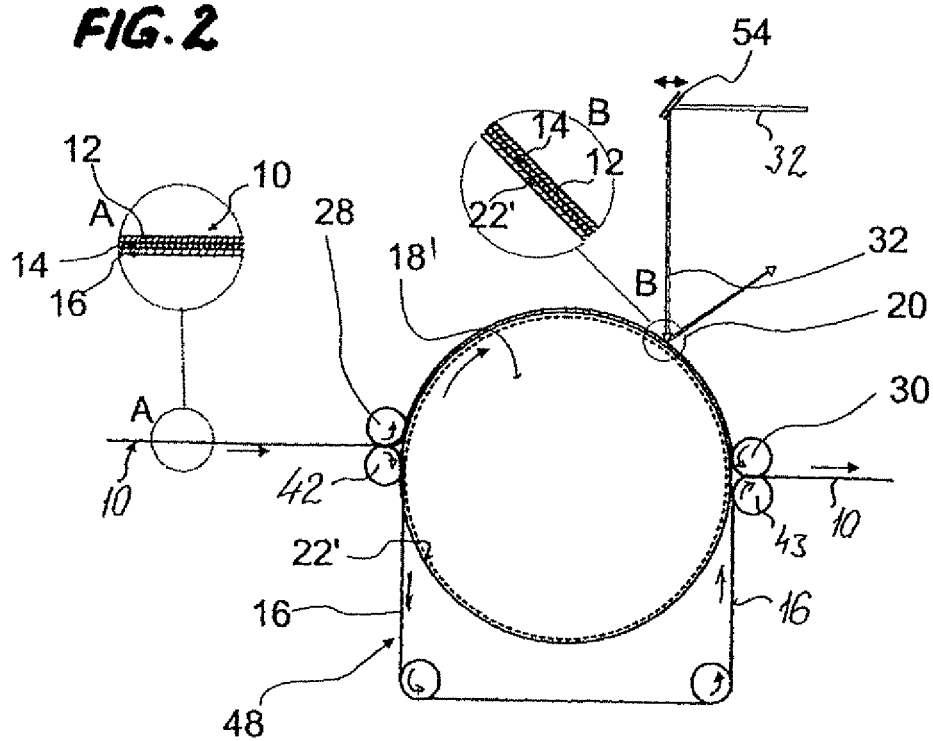
Figure 3:
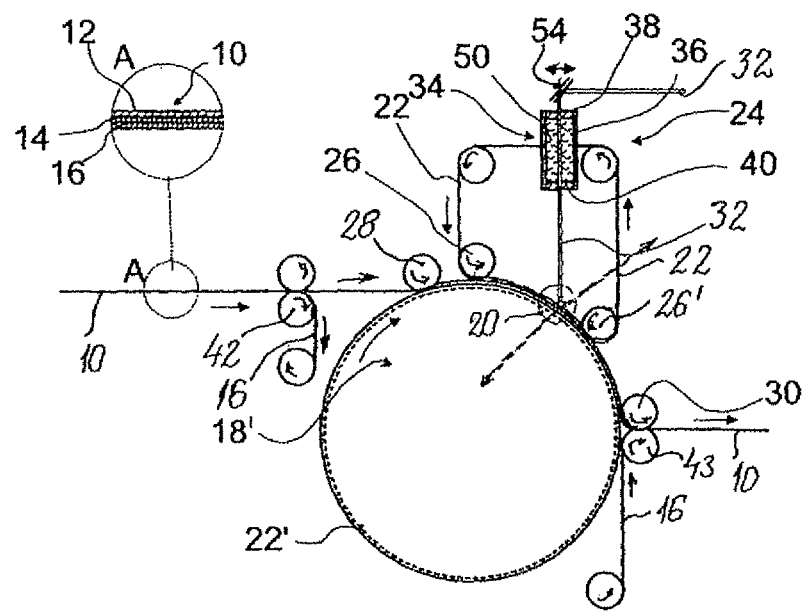
Figure 4:
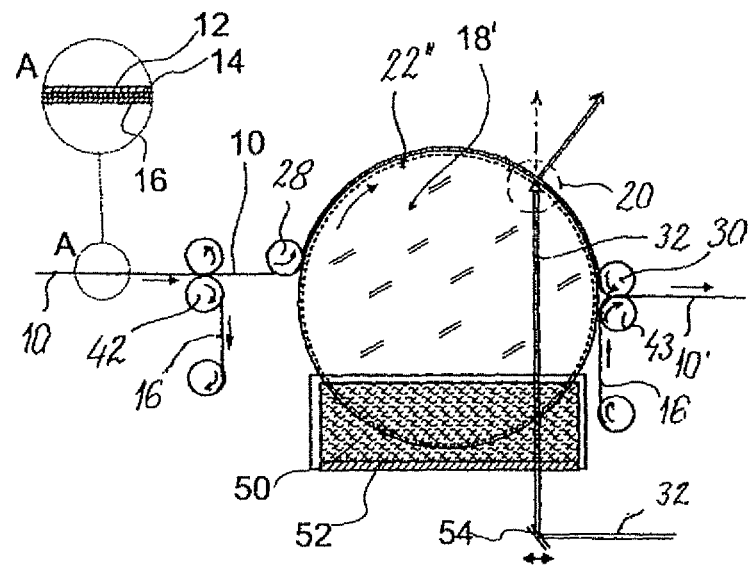

In the following, the invention will be described in more detail by using different embodiments with reference to the drawings, wherein:

FIG. 1 schematically shows a first embodiment of a device for producing volume transmission holograms;

FIG. 2 schematically shows a second embodiment of a device for producing volume reflection holograms;

FIG. 3 schematically shows a third embodiment of a device for producing volume transmission and/or reflection holograms, and FIG. 4 schematically shows a fourth embodiment of a device for producing transmission holograms with a glass drum.

FIG. 1 shows a device for the automated performing of a method for producing a contact copy of a master hologram on a holographic film (transmission hologram), in particular on a film 10 having a backing foil 12 and a holographic layer which can be, in particular, a photopolymer layer 14. Moreover, in its original state the film has a protective layer 16 which is laminated onto the photopolymer layer 14.

The device has a drum 18 over which the film 10 is guided and which moves the film 10 through an exposure zone 20 on the surface of the drum 18 in a rolling movement.

Also, a section view of the film 10 in a portion A is shown in an enlarged view in FIG. 1, wherein the layering of the film can be clearly seen.

A transparent master hologram 22 closed in an endless loop is guided in a (film) guiding device 24 arranged radially outside the drum 18 which comprises several guide and/or tensioning rolls 26. The master hologram 22 is unrolled supported on the film 10, which in turn is firmly supported by the surface of the drum 18, and moves simultaneously and free of slippage together with the film 10 in the exposure zone 20. Thus, in the exposure zone 20, the film 10 is arranged between the master hologram 22 and the surface of the drum 18. By means of the guide and/or tensioning rolls 26, the guide device 24 creates a tensile stress in the master hologram 22 which, due to the cylindrical shape (convexity) of the surface of the drum 18, is transformed into a load pressure of the master hologram exercised on the film 10. According to the same working principle, additional guide and tensioning rolls 28, 30 create a load pressure of the film 10 which is exercised on the drum 18, before and behind the area of contact with the guide device 24 of the master hologram 22. By static friction or by other suitable measures, the drum 18 advances the film 10 free of slippage, and the master hologram 22 is also moved free of slippage together with the film 10 (and firmly supported lying on it). The drum 18 and/or the guide device 24 are continuously driven by an electric motor not shown here.

The exposure laser beam 32 is linearly expanded by cylindrical optics (in the axial direction of the drum) and thus illuminates the transparent master hologram 22 and the film 10 in a line axial to the drum 18. In the exposure zone 20, the exposure laser beam 32 has an angle of approximately 45° to a tangent to the (or a diagonal of the) drum 18.

During the transition of the transparent master hologram 22, the exposure laser beam 32 takes up the information stored within it and a zero diffraction order of the exposure laser beam 32 interferes, in the photopolymer layer 14 of the film 10, with the first diffraction order of the exposure laser beam 32. In this way, the information stored in the master hologram 22 is written on the photopolymer layer 14. A contact copy of the master hologram 22 is produced, where additional development and/or curing steps must take place depending on the type of holographic film. The backing foil 12 of the film 10 is transparent and the surface of the drum 18 is preferably black so that the light of the exposure laser beam 32 is absorbed after it has passed through the film 10.

The exposure laser beam 32 passes through the master hologram 22 not only in the exposure zone 20 directly on the surface of the drum 18, but also in an irradiation area 34 arranged vertically above the exposure zone 20, in which irradiation area the exposure laser beam 32 is guided through the transparent master hologram 22 into an interior of the master loop and thus of the guide device 24. Then the exposure laser beam 32 is guided from the interior into the exposure zone 20. In this manner, deflection optics within the loop become obsolete. A cell 36 for making the exposure laser beam 32 pass through without reflection is arranged in the irradiation area 34.

An upper guide roll 45 of the guide device 24 is provided adjustably, e. g. adjustably vertically. By an adjustment of the roll 45, the angle with which the exposure laser beam 32 impinges on the master hologram 22 in the irradiation area 34 can be altered. This angle can be selected such that the exposure laser beam passes through the master hologram 22 in the cell 36 without being disturbed.

The cell 36 has a lid 38 and a bottom 40 made of non-reflecting glass and is completely filled with an index match liquid 50. The master hologram 22 is guided laterally into the cell 36 and out of the cell 36 through slots (not shown in detail) sealed by slot seals. The slot seals are configured in such a way that the master hologram 22 is not completely dry when it exits the cell 36, but is covered by a thin film of index match liquid (not necessary with photopolymer) on one (the outer) side. Thus, when the master hologram 22 is applied on the film 10 by the first lower guide and/or tensioning roll 26 of the guide device 24, there is a thin liquid film between the master hologram 22 and the film which prevents undesired reflection of the exposure laser beam 32 on the interface between the master hologram 22 and the film 10. The guide and/or tensioning roll 26 creates a contact pressure radial to the drum 18 which is sufficient to make this (humid) contact area free of bubbles.

When the film 10 is guided onto the drum 18 at the inlet of the device, the protective film 16 is previously removed from the film 10 by a stripping guide roll 42. In this manner, a negative effect on the quality of the contact copy can be avoided. Alternatively, removal of the protective film 16 can only take place at the guide and/or tensioning roll 28 (see FIG. 2). The protective film 16 is rolled onto a roller 44 and can be re-used. At the output of the device, the previously removed or a new protective film 16 is then unrolled from a roll 46 with the protective film and (re-)laminated onto the film 10, which has passed through the exposure zone 20, by a laminating roller 43 so as to again protect the photopolymer layer 14. The film 10 is guided in such a way over the drum 18 that the photopolymer layer 14 is radially outside and directly contacts the master hologram 22.

In an alternative configuration, the film 10 can be inversely oriented so that the photopolymer layer 14 is located radially inside of the film and is overlying the drum 18. The latter configuration is particularly, but not exclusively, useful in the production of transmission holograms described as follows.

A diverting mirror 54 is arranged in the optical path of the exposure laser beam 32 which mirror can be adjusted by one or more linear motors (which are not shown). During exposure, the position of this diverting mirror can be altered in dependence on the feeding position of the master hologram 22 in the film guide mechanism 24. By the adjustment of the diverting mirror 54, the incident angle of the exposure laser beam 32 in the exposure zone 20 is altered. In this manner, a diverging reference wave can be taken into account so that any image distortion caused by the diverging reference wave can be compensated during observation of the volume hologram and the Bragg conditions for reconstruction are met.

FIG. 2 shows an embodiment of the invention which illustrates how for the production of reflection holograms, the film guide device 24 which forms a separate assembly has simply been removed. Alternatively, the guide device can be left on the device and only the master hologram 22 can be removed from it (not shown). Instead, another (second) master hologram 22' is mounted on a drum surface of the drum 18 so that a kind of master drum is produced. The master hologram 22' can now be laminated onto bent plates which in turn are screwed onto the drum 18.

Also, in a particularly advantageous manner, the master drum 18 can be embodied as a magnetic drum or a drum equipped with magnetic elements, on which a flexible master 22' with at least partially magnetic flexible surfaces can be very easily attached in a spanning manner and easily changed.

The film 10 is exposed in the exposure area 20 by interferences between directly incident components of the exposure laser beam 32 and components of this exposure laser beam 32 which are reflected by the master hologram 22 and again pass through the film.

Here, the protective film 16 is removed from the film 10 (inserted with reversed sides as compared to FIG. 1) shortly before the film 10 is guided (inserted) over the drum 18, and guided back to the film 10 in output by means of a reversal mechanism 48 and laminated onto it after the film 10 has passed through the exposure zone 20. Whereas in the embodiment according to FIG. 1, a repositioning of the rolls 44, 46 takes place when the roll 44 is full or the roll 46 is empty (or a completely new full roll is inserted), this operation step is omitted in the embodiment according to FIG. 2 so as to enable continuous operation.

FIG. 3 shows an embodiment of the device according to the invention wherein the film 10 is not guided over the drum 18 in an angular range of approximately 180°, as in FIGS. 1 and 2, but in a smaller angular or circumferential range. Here as well, the film is introduced with reversed sides, so that the photopolymer layer 14 is directly supported by the master drum, as in the embodiment of FIG. 2. Also, it can be seen that this device is substantially a combination of the devices shown in FIGS. 1 and 2 and therefore provides or can provide the same features as the devices described above.

Thus, in all embodiments of the invention, in principle a transparent master hologram 22 on the film guide device 24 and a reflecting master hologram 22' on the master drum 18 can be used simultaneously to produce a hologram which functions both as a transmission volume hologram and as a reflection volume hologram.

Therefore, the device according to the invention can be used and configured in different operation modes, i. e. on the one hand for producing a volume transmission hologram and on the other hand for producing a volume reflection hologram in a continuous process, and can be used for both types of holograms at the same time or individually, as required. This depends on whether the guide device 24 with the master 22 and/or the master 22' is present or activated, respectively.

Finally, FIG. 4 shows another embodiment of the device wherein the master drum 18 is embodied as a glass cylinder. The glass cylinder can be formed from solid material or hollow. The exposure laser beam 32 expanded to a line is irradiated from below into the drum 18 or into the glass cylinder. For avoiding reflections on the surface of the glass cylinder, the latter is immersed in a bath of index match liquid 50 whose bottom 52 is formed by a non-reflecting glass. Therefore, the exposure laser beam 32 passes through the bottom 52, the index match liquid 50 and the glass cylinder without any reflection on the respective surfaces and impinges, in the exposure zone 20, the transparent master hologram 22" from the interior of the glass cylinder, which hologram is mounted on the surface of the glass drum 18. The film 10, which is inserted side-inverted here as well, i. e. with the photopolymer layer 14 downward, can have a reflective layer so that the information stored in the master hologram 22" can be stored as a reflection hologram in the film 10. What is shown here, however, is a non-reflecting embodiment for producing a transmission hologram. It is not shown that, if the drum 18 is hollow, for preventing reflections during the exit through the glass wall of the drum 18, another cell with an index match liquid and a lid of non-reflecting glass can be arranged in the interior of the drum 18 so as to avoid reflections of the exposure laser beam 32.

LIST OF REFERENCE NUMBERS 10. film
12. backing foil
14. photopolymer layer (holographic layer)
16. protective film
18. drum
20. exposure zone
22. first, transparent, master hologram
22'. second, reflective, master hologram
22". second, transparent, master hologram
24. (film) guide device
26. tensioning roll (guide roll)
28. tensioning roll (guide roll)
30. tensioning roll (guide roll)
32. exposure laser beam
34. irradiation area
36. cell
38. lid
40. bottom
42. guide roll (stripping roll)
43. guide roll (lamination roll)
44. roll (guide roll)
45. roll (guide roll)
46. roll (guide roll)
48. deviation mechanism
50. index match liquid
52. bottom
54. diverting mirror
α=incident angle

The invention claimed is:

1. Method for producing volume transmission and/or reflection holograms on a photosensitive film having a backing foil, a holographic layer and a protective film,
wherein the film is guided over a drum, brought in contact with a master hologram on the drum and moved through an exposure zone together with the master hologram, in which zone the film and the master hologram are irradiated with a linearly expanding exposure laser beam for reproducing the master hologram in the photopolymer layer,
wherein
there is only one drum and both reflection and transmission volume holograms are produced simultaneously or individually in the photopolymer layer of the film guided over the drum dependent upon two master holograms that are present either simultaneously or individually at least at the exposure zone of the drum, wherein the master holograms are moved synchronously with the drum and with the film overlying the drum and the first master hologram is located radially on the outside surface of the film and the second master hologram is applied on the drum radially on the inside surface of the film;
wherein the laser beam traverses at least one of the master holograms twice before irradiating the film.

2. Method according to claim 1, wherein the first master hologram is a transparent master hologram and fauns a closed loop which is guided in a guide device arranged radially outside the drum without surrounding the drum.

3. Method according to claim 2, wherein the exposure laser beam is guided through an outer portion of the loop of the master hologram into an interior of the loop in an irradiation area and is radiated into the exposure zone from the interior of the master loop.

4. Method according to claim 3, wherein in the upper irradiation area, a cell filled with an index matching liquid is arranged so that the exposure laser beam is guided through the master hologram into the interior of the master loop without any reflections, and in that a film or thin layer of an index matching liquid is introduced in a contact area between the holographic layer and the master hologram.

5. Method according to claim 3, wherein if the angle at which the exposure laser beam impinges the master hologram in the outer irradiation area is altered, an upper guide roll and/or inclination of the cell is adjusted in such a way that the exposure beam passes through the master hologram in the cell without being disturbed, and wherein during exposure, a diverging reference wave is created by a movable diverting mirror and/or by vibration of the laser beam.

6. Method according to claim 2, wherein the master drum has a glass cylinder into which the linearly expanding exposure laser beam is irradiated in a first portion of the drum so that the exposure laser beam in the exposure zone exits the glass cylinder of the drum from radially inside, producing a transmission hologram, with the glass cylinder of the master drum being immersed in an index matching liquid in the first portion.

7. Method according to claim 2, wherein a first angle of incidence of the exposure laser beam on the film is altered in dependence on a position of the master hologram.

8. Method according to claim 2, wherein before and behind the area of contact of the film with the drum, the film is guided over one respective guide roll and one respective tensioning roll and wherein previously at the input and the subsequently output the protective film is removed from the film and re-laminated onto it via a stripping roll and a lamination roll, and wherein the initially removed protective film is guided to the film which has now been exposed by a reversing mechanism and is therefore re-laminated onto the film after the latter has been exposed to light.

* * * * *

UNITED STATES PATENT AND TRADEMARK OFFICE
CERTIFICATE OF CORRECTION

| | | |
|---|---|---|
| PATENT NO. | : 8,599,458 B2 | Page 1 of 1 |
| APPLICATION NO. | : 13/128878 | |
| DATED | : December 3, 2013 | |
| INVENTOR(S) | : Günther Dausmann | |

It is certified that error appears in the above-identified patent and that said Letters Patent is hereby corrected as shown below:

In the Claims:

Column 8, claim 2, line 28: should be corrected as follows:

Change

-- hologram is a transparent master hologram and fauns a closed -- to

"hologram is a transparent master hologram and forms a closed"

Signed and Sealed this
Eleventh Day of February, 2014

Michelle K. Lee
*Deputy Director of the United States Patent and Trademark Office*